United States Patent [19]
Jaeger et al.

[11] Patent Number: 5,774,115
[45] Date of Patent: Jun. 30, 1998

[54] CIRCUIT CONTROL PANEL WITH VARIABLE GRAPHICS DISPLAY

[75] Inventors: Denny Jaeger; Kenneth M. Twain, both of Oakland, Calif.

[73] Assignee: Intertactile Technologies Corporation, Oakland, Calif.

[21] Appl. No.: 644,795

[22] Filed: May 10, 1996

Related U.S. Application Data

[63] Continuation-in-part of Ser. No. 420,438, Apr. 10, 1995, Pat. No. 5,572,239, which is a continuation of Ser. No. 225,782, Apr. 11, 1994, abandoned, which is a continuation-in-part of Ser. No. 147,545, Nov. 5, 1993, abandoned.

[51] Int. Cl.$^6$ ................................................. G09G 5/00
[52] U.S. Cl. ........................... 345/172; 345/184; 341/23
[58] Field of Search .................................. 345/168, 169, 345/170, 171, 172, 273, 184, 905; 341/22, 23, 28, 33, 34

[56] References Cited

U.S. PATENT DOCUMENTS 5,418,760   5/1995   Kawashima et al. .................... 345/173

FOREIGN PATENT DOCUMENTS 2038055   7/1980   United Kingdom ................... 345/172
9512877   5/1995   WIPO .

*Primary Examiner*—Regina Liang
*Attorney, Agent, or Firm*—Harris Zimmerman

[57] ABSTRACT

Circuit control devices of the kind having operator manipulated control members are disposed at the face of an electronically controlled flat panel display within the image display area. This enables display of calibration marks and/or other graphics that can change instantly and automatically in response to changing operating conditions. Operating power for the control devices is inductively transmitted from the back of the display or from the back of the transparent cover plate of the display through spaced apart coils. Control signals produced by the control devices are inductively transmitted to the back of the display or to the back of the cover plate through the same coils or through additional coils. This provides for coupling of the control devices with the controlled circuit without internal modifications of the flat panel display and without requiring that conductors extend across displayed images at the front surface of the display.

22 Claims, 6 Drawing Sheets

FIG. 3
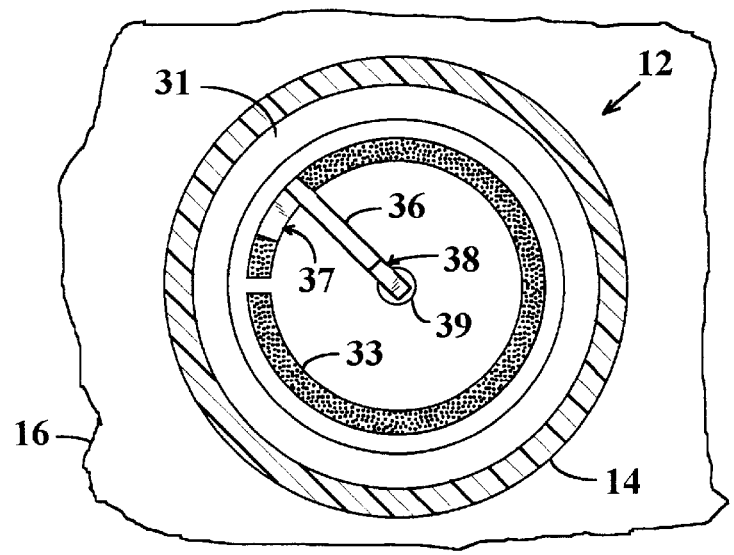
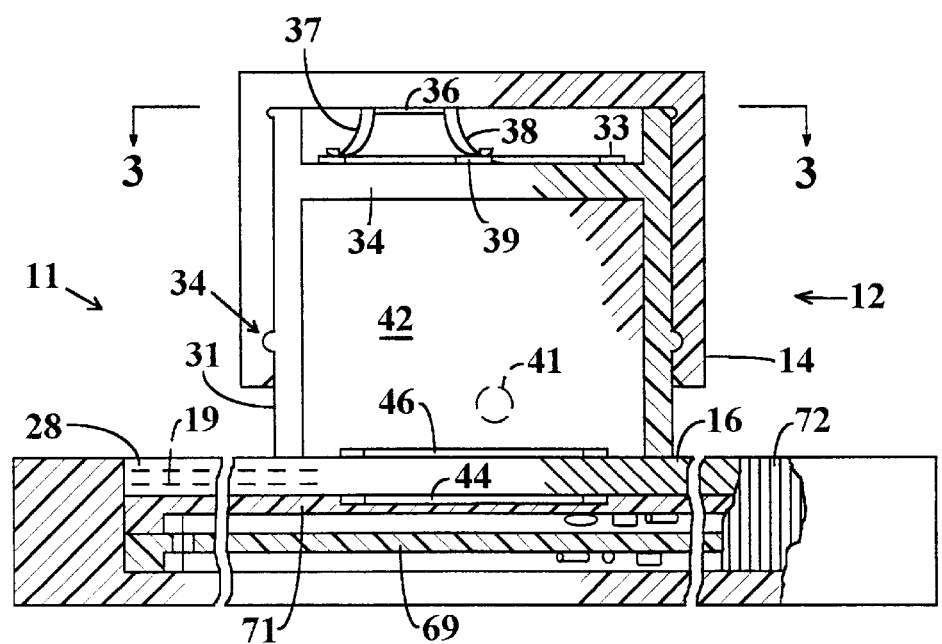
FIG. 2

CIRCUIT CONTROL PANEL WITH VARIABLE GRAPHICS DISPLAY

Cross Reference to Related Applications

This is a continuation-in-part of application Ser. No: 08/420,438 filed Apr. 10, 1995 U.S. Pat. No. 5,572,239 which was a continuation of application Ser. No: 08/225,782 filed Apr. 11, 1994 and which is now abandoned. Application Ser. No: 08/225,782 was a continuation-in-part of application Ser. No: 08/147,545 filed Nov. 5, 1993 which is now abandoned.

TECHNICAL FIELD

This invention relates to devices which enable operator control of electrical circuits. More particuularly the invention relates to manually operated circuit control devices which are associated with an electronic display screen that displays changeable images which convey information pertinent to operation of the circuit control device.

BACKGROUND OF THE INVENTION

Devices for enabling operator control of electrical apparatus may variously have turnable or slidable knobs, depressible switch buttons, pivotable levers or the like which are manipulated by an operator in the course of controlling the apparatus. In most cases symbols, legends graduation marks or other graphics are associated with the control device. The graphics identify settings of the operator manipulated member, identify the function of the control device or provide other information which facilitates operation of the control. Graphics of this kind are often permanently imprinted at a location adjacent to or close to the operator manipulated element of the control device.

Imprinted graphics can convey only a limited amount of information and cannot be easily changed. Many recent electronic systems have controls that are used for different purposes during different modes of operation of the system. Permanent graphics designed to facilitate one mode of operation of the system are usually inappropriate during other modes of operation. Plural sets of labels, graduation marks and the like can be imprinted on the face of a control panel or the like but this can be confusing to the operator and can cause imprecise setting of a control if some of the graphics must be located away from the immediate vicinity of the operator manipulated member of the control. An overlay having different graphics can be placed on a control panel or the like when the functions of the controls change but this is a diversion which complicates and slows operation of the controls.

It has heretofore been recognized that operation of circuit control devices can be facilitated by using an electronic image display screen to provide graphics pertaining to operation of a circuit control device. The graphics can change instantly and automatically when the function of the control device changes.

In most prior circuit controls of this kind the electronic display screen is situated on a control panel or other support at location that is adjacent to or near the control member that is manipulated by an operator. The image area of the screen is smaller than the total area of the face of the screen as structural framing, seals, electrical conductors and the like are situated in the marginal region of the screen. Consequently, labels and other graphics are necessarily spaced a distance away from the knob, button, key or the like to which they relate. This is not conducive to display of calibration marks or other graphics in immediate proximity to the movable member of the control device and can result in operator confusion as to which control a particular graphic relates to in instances where plural controls are present on a control panel.

Changeable graphics can be displayed in immediate proximity to a circuit control device by situating the device within the image display area of an image display screen. Arrangements must then be provided for electrically connecting the control device with components which are away from the image display area. It would be advantageous to effect such connections in a manner which avoids obscuring of image pixels and which requires no alteration or minimal alteration of the internal construction of the flat panel display.

The present invention is directed to overcoming one or more of the problems discussed above.

SUMMARY OF THE INVENTION

In one aspect of the present invention, a control panel for an electrical circuit has at least one control device that can be manually operated to change an electrical condition in the circuit. An electrically controlled flat panel display presents changeable images that convey information pertinent to operation of the control device, the flat panel display having an image display area. The control device is attached to the transparent cover plate of the flat panel display and is located at least partially within the image display area. A first coil is is situated behind the cover plate and an electrical power source applies a varying voltage to the coil. A second coil is situated in front of of the cover pate and is coupled to a power input conductor of the control device.

In another aspect of the invention, the control signal that is produced by the control device is received by a modulator which produces an oscillating voltage signal that is encoded to represent the current value of the control signal, the modulator being coupled to the second coil to apply the oscillating voltage signal thereto. A demodulator receives the oscillating voltage signal from the first coil and has at least one output conductor for transmitting the control signal to the controlled electrical circuit.

In another aspect, the invention provides an electrical ciruit control panel which includes an electrically controlled flat panel display having a transparent cover plate with an image display area at which changeable images may be viewed. An electrical circuit control device is disposed in front of the flat panel display within the image display area. The circuit control device has a fixed base secured to the front surface of the cover plate and a movable member which can be manipulated by an operator to change an electrical condition in the controlled electrical circuit. The control device includes a power input conductor and a control signal output conductor. A first coil is disposed at a location which is behind the circuit control device and behind the cover cover plate. An electrical power source is coupled to the first coil and applies an oscillating voltage thereto. A second electrical coil is disposed within the base of the circuit control device and is coupled to the power input conductor of the device.

In still another aspect of the invention, the circuit control panel includes a third coil situated at a location which is behind the transparent cover plate and a fourth coil situated within the control device. A modulator within the control device produces an oscillating voltage signal that encodes the control signals that are produced by the device, the modulator being coupled to the fourth coil to apply the oscillating voltage signal thereto. A demodulator is coupled to the third coil to receive the oscillating voltage signal therefrom and converts the oscillating voltage signal to digital data bytes encoding the control signals.

The invention provides instantly changeable labels, calibration marks and/or other graphics for one or more circuit control devices which graphics may have any desired form and be at any desired location in the vicinity of the operator manipulated component of the control device. The control device is situated at the face of a flat panel display and is at least partially within the image display area to enable presentation of graphics in close proximity to the operator manipulated component. Operating power is supplied to the control device without requiring conductors on the front surface of the display that might obscure image pixels and without requiring internal modification of the flat panel display to provide for electrical connections to the control device. Power is transferred inductively from a first coil situated behind the display or behind a transparent cover plate of the display to a second coil situated at the front of the cover plate at the location of the control device. In one form of the invention the same coils or an additional pair of coils inductively transmit the control signals produced by the control device to a location at the back of the display or at the back of the transparent cover plate. This enables interconnection of the control device and the controlled circuit without using conductors at locations where such conductors could impair displayed images.

The invention, together with further aspects and advantages thereof, may be further understood by reference to the following description of the preferred embodiments and by reference to the accompanying drawings.

BRIEF DESCRIPTION OF THE DRAWINGS

FIG. 2 is a broken out view of a portion of one side of the control panel of FIG. 1 taken along line 2—2 thereof.

FIG. 3 is a section view taken along line 3—3 of FIG. 2.

DETAILED DESCRIPTION OF THE PREFERRED EMBODIMENTS

Figure 1:
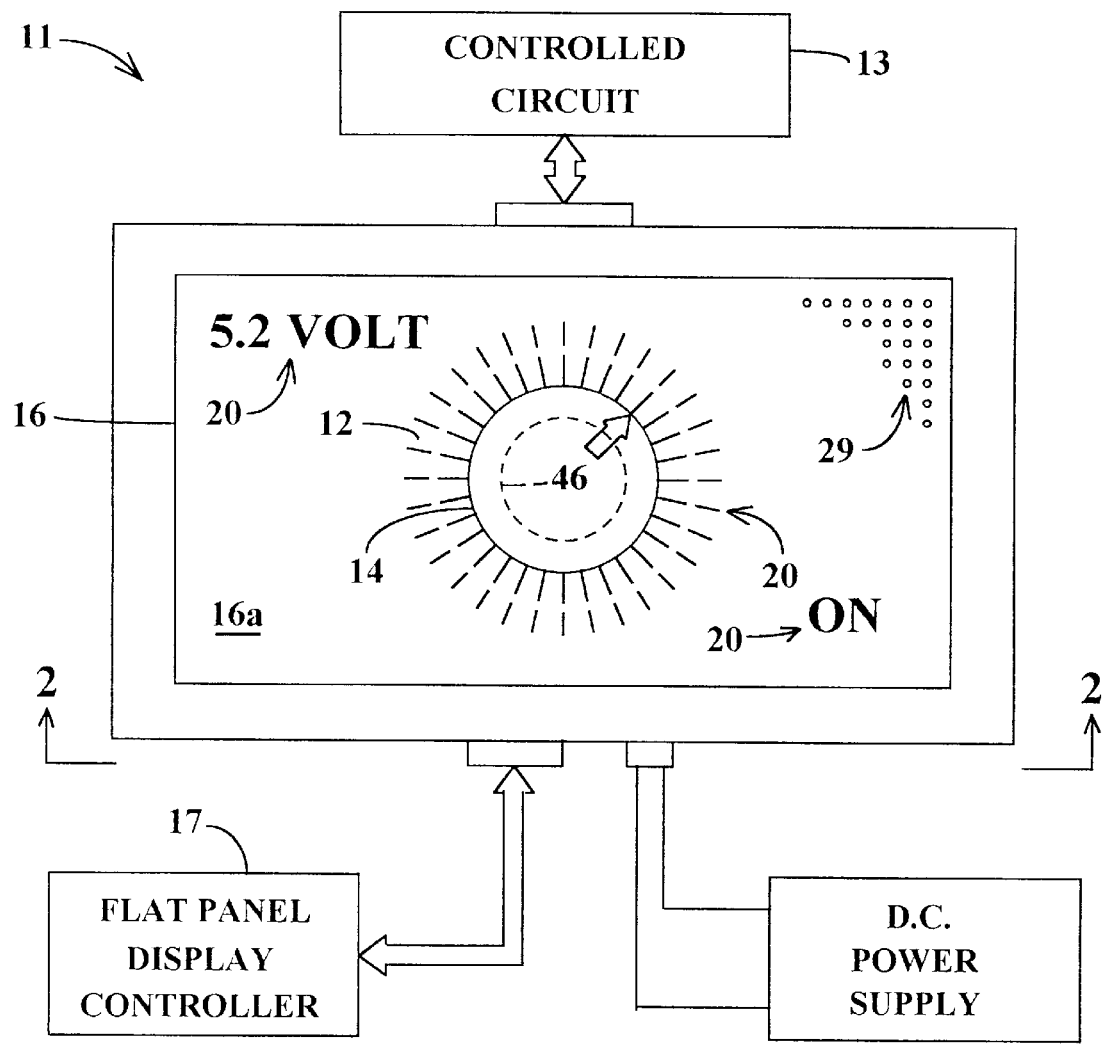
FIG. 1 is a front view of an electrical circuit control panel embodying the invention.

Referring initially to FIG. 1 of the drawings, a control panel 11 embodying the invention has one or more electrical circuit control devices 12 of the type which are manually operated to change an electrical condition in a controlled electrical circuit 13. In this particular example, the control device 12 is a rotary potentiometer of the form having a knob 14 which is turned by an operator to vary the magnitude of a control signal voltage. This control device 12 may be replaced with a control device of any of the diverse other types that produce control signals in response to operator adjustment of a rotary or slidable knob, pivoting of a lever, depression of a switch button or other forms of manipulation by an operator. The control panel 11 may have additional control devices 12 if the controlled circuit 13 requires additional control signals.

Control panels 11 embodying the present invention differ from prior apparatus of this kind in that one or more of the control devices 12 are situated at least partially within the image display area 16a of an electrically controlled flat panel display 16 of one of the known types that can generate any desired image or images at any location in the image display area. Labels, calibration marks and other graphics 20 which assist the operator in identifying and adjusting the control device 12 or devices are images generated by the flat panel display 16 and can change instantly and automatically when the function of a control device changes or in response to operation of a control device. A flat panel display controller 17 which may be of known design is coupled to the display screen to cause display of the changeable graphics 20.

Situating the control devices 12 directly in front of the image display area 16 in this manner enables display of graphics 20 at locations which are close to the devices and which can be immediately adjacent to the knob 12 or other component that is manipulated by the operator. This avoids operator error with respect to associating the graphics with the particular control device to which they relate and enables precision setting of control devices.

Figure 4:
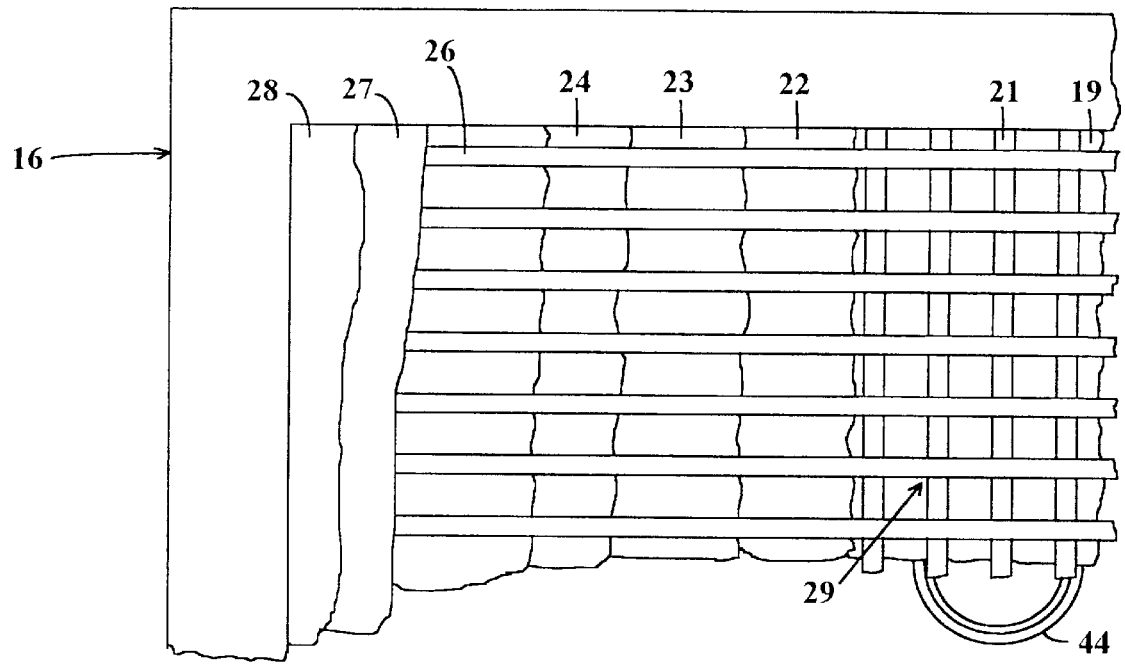
FIG. 4 is a broken out frontal view of a portion of the control panel of the preceding figures showing the multi-layered construction of a flat panel display screen which is a component of the apparatus of the preceding figures.

Referring jointly to FIGS. 2 and 4, for purposes of example the flat panel display 16 of this particular embodiment is of the TFEL (thin film electro-luminescent) type although the invention is also applicable to other types of display. Flat panel displays 16 of this kind are multi-layered and have a flat glass or ceramic substrate 19 overlaid, in sequence, by a layer of row busbars 21, a first dielectric layer 22, a phosphor layer 23, a second dielectric layer 24, a layer of column busbars 26, a sealing and passivation layer 27 and a transparent cover plate 28 which may be glass or clear plastic. Row busbars 21 are parallel conductive traces bonded to substrate 19 and extend in an x-coordinate direction. Column busbars 26 are similar conductive traces deposited on the second dielectric layer 24 and extend in a y-coordinate direction. The points at which the row and and column busbars 21 and 26 cross each other define the image pixels 29 at which the phosphor layer 23 emits light when a voltage difference is applied across the row and column busbars that cross each other at a particular pixel location. Thus any desired image can be produced by applying a voltage difference across the particular row busbars 21 and column busbars 26 that define image pixels 29 at which light needs to be emitted to form the image.

At least the second dielectric layer 24 and sealing and passivation layer 27 and cover plate 28 are formed of light transparent material. Row busbars 21 are preferably formed of low resistivity opaque metal conductor while the column busbars 26, which are in front of the phosphor layer 23, are formed of transparent conductive material such as indium tin oxide.

For clarity of illustration certain components of the display screen 16 are shown in the drawings with a greater thickness, greater spacing and/or as being fewer in number than is actually the case in a typical display screen which embodies the invention. Such components may be too minute to be depicted with the preferred sizes and spacings in drawings which depict the entire display screen 16 or a sizable portion of the screen. For example, the busbar conductors 21 and 26, insulation layers 22, 24 and phosphor layer 23 are typically extremely thin films which may be formed by photolithic techniques and deposition techniques known to the art. Busbar conductors 21 and 26 are typically more minute, greater in number and more closely spaced than can be depicted in FIGS. 2 and 3. In order to provide images which exhibit desirably high resolution there may, for example, be 80 to 300 busbar conductors per inch and thus a similar number of image pixels 29 per inch.

Referring to FIGS. 2 and 3, the circuit control devices such as potentiometer 12 are secured to the transparent cover plate 28 preferably by an adhesive or by solder glass. In this example, knob 14 of the potentiometer 12 snap engages onto an annular lip 34 which extends from an annular fixed base 31 that is adhered to the face of the cover plate 28. A discontinuous circular band of electrically resistive material 33 is bonded to a shelf 34 within the base and is centered on the axis of rotation of the knob 14. A conductive wiper 36 secured to the underside of knob 14 has a first resilient arm 37 which contacts and rides along the circular resistive band 33 as the knob is turned and a second resilient arm 38 that contacts a conductive pad 39 bonded to the cover plate 28 at the center of base 31. Electronic circuit components 41 of the control device 12, which will hereinafter be described, are secured to a circuit board 42 which is contained within the base 31 below shelf 34. The two ends 43 of the resistive band 33 are connected across a voltage source in a manner which will hereinafter be further described. Consequently a control signal is produced at conductive pad 39 in the form of of a voltage having a magnitude that is selected by the operator by turning knob 14.

Thus the control device 12 must be electrically coupled to one or more external circuits in order to receive input voltage and in order to deliver control signals to a controlled circuit. The present invention enables coupling of the control devices 12 to external circuits without requiring that conductors extend along the front surface of the flat panel display 16 within the image display area and without requiring any internal modifications of the flat panel display for the purpose.

Figure 5:
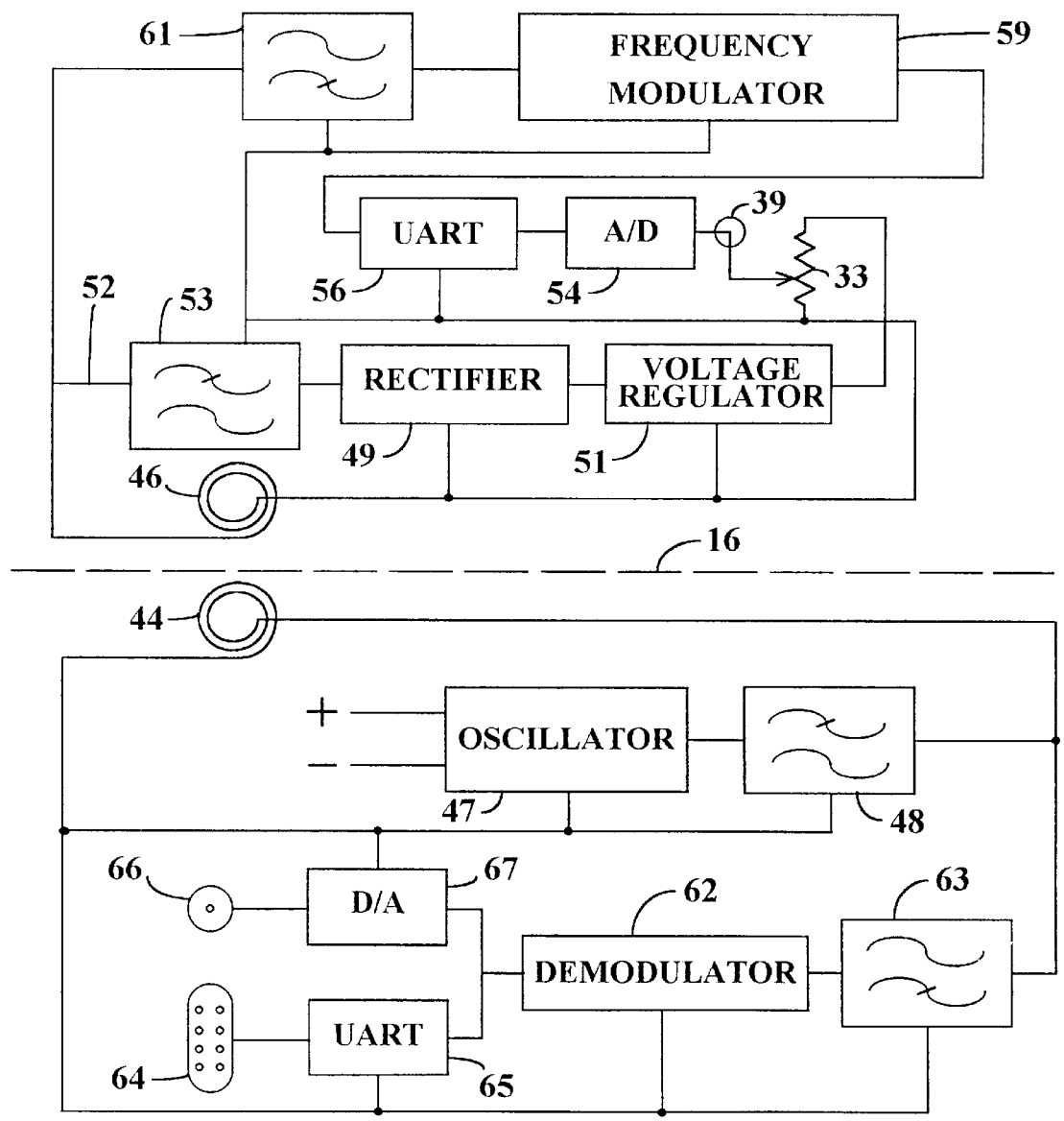
FIG. 5 is a schematic circuit diagram showing electronic components of the circuit control panel of the preceding figures.

Referring jointly to FIGS. 2 and 5, operating power for the control device 12 is inductively transmitted through the flat panel display 16 by a first coil 44 situated behind the display and a second coil 46 which is at the front of the display within the base 31 of control device 12. First coil 44 may be a conductive trace bonded to the back of the substrate layer of the flat panel display 16 and second coil 46 may be a similar trace bonded to the front of the cover plate 28, the two coils preferably being centered on a common axis. The coils 44 and 46 are preferably of flat spiral form, coil 44 being bonded to the back of the substrate layer 19 of the flat panel display and coil 46 being bonded to the front surface of the cover plate 28.

Referring to FIG. 5 in particular, components of the electrical circuit which are within the control device appear above dashed line 16 and components which are at the back of the flat panel display appear below line 16. At the back of the display 16 an oscillator 47 is coupled to the first coil 44 through a low pass filter 48 that transmits alternating current having the frequency that is produced by the oscillator but which does not transmit higher frequencies. DC power for operating components of the control device is provided by a rectifier 49 and voltage regulator 51 connected to the second coil 46 through a power input conductor 52, the rectifier and voltage regulator being in series relationship with each other and being in series relationship with another low pass filter 53 that transmits the frequency which is outputted by oscillator 47 and which does not transmit higher frequencies. The regulated DC voltage is applied to the previously described resistive band 33 of the control device in this particular example of the invention and also provides operating power for the other components of the control device circuit.

The first and second coils 44 and 46 are also used to transmit the operator selected control signal from the front of the flat panel display to the back of the display. For this purpose, an analog to digital signal converter 54 is connected to the previously described conductive pad 39 of the potentiometer and outputs a multi-bit digital signal having a value determined by the current magnitude of the control signal voltage at the pad. The digital signal is serialized by a UART (universal asynchronous receiver/transmitter) 56 and is then used to modulate the output frequency of a frequency modulator 59. Modulator 59 produces two different frequencies one of which represents a digital 1 and the other of which represents a digital 0. Both frequencies are higher than the frequency of oscillator 47. Modulator 59 is connected across second coil 46 in series with a high pass filter 61 which passes the frequencies that are generated by the modulator while suppressing lower frequencies including the frequency produced by oscillator 47.

The AC signals from modulator 59 are converted back to DC digital form by a demodulator 62 which is connected across the first coil 44 in series with another high pass filter 63 that passes the frequencies outputted by modulator 59 while suppressing the lower frequency generated by oscillator 47. The serial form digital control signals produced by demodulator 62 may be transmitted directly to a controlled circuit of a type which responds to control signals of that type. Alternately, the output of demodulator 62 may be coupled to a multi-channel connector 64 through another UART 65 to provide parallel form digital control signals to a controlled circuit that requires such signals. The output of the demodulator 62 may be coupled to a two channel connector 66 through a digital to analog converter 67 to provide the control signal to a controlled circuit of the type that responds to control signals in the form of a variable DC voltage.

Filters 48, 53, 61 and 63 serve to electrically isolate components of the power circuit and components of the control signal circuit from each other.

Frequency modulator 59 can be replaced with an amplitude modulator which varies the amplitude of a single frequency in response to changes of the control signal voltage at conductive pad 39.

Efficiency of the inductive transfer of power and signals between the coils 44 and 46 is a function of the spacing of the coils from each other which spacing is preferably minimized to the extent possible. Referring again to FIG. 2, prior flat panel displays often locate the busbar driver circuitry at a circuit board which is immediately behind the substrate layer 19 of the display. In the present invention driver circuit board 69 is preferably spaced a small distance outward from the substrate layer 19 to enable placement of the first coil 44 directly against the back of the substrate layer and to provide room for another circuit board 71 which carries the components of the above described power and control signal circuits that are at the back of the flat panel display 16. Electrical connection of the driver circuit board 69 with the individual busbars is provided for by multi-channel ribbon connectors 72 which are disposed against the sides of circuit board 69 and which extend to the sides of the flat panel display 16.

Figure 6:
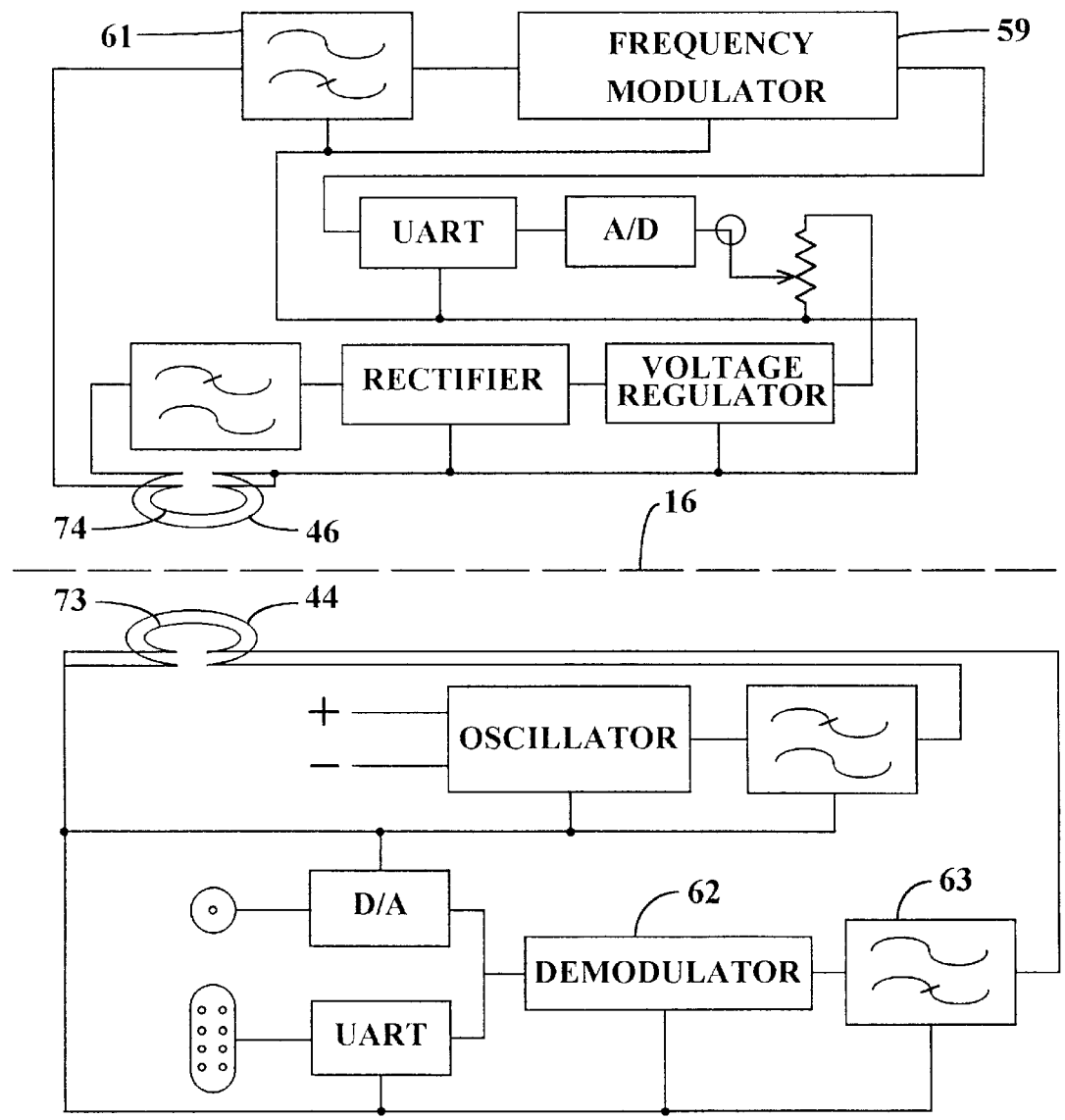
FIG. 6 is another schematic circuit diagram showing modified electronics for a second embodiment of the invention.

The above described embodiment of the invention uses a single pair of coils 44 and 46 to transfer both power and control signals between the front and the back of the flat panel display screen 16. Referring to FIG. 6, the first and second coils 44 and 46 may be used only for the transfer of power and a third coil 73 and fourth coil 74 may be used to transfer the control signals to the back of the screen. Third coil 73 is at the back of the display screen 16 and is preferably of smaller diameter than the first coil and disposed in concentric relationship with the first coil. Fourth coil 74 is at the front of the display screen 16, has a smaller diameter than the second coil 46 and is in concentric relationship with the second coil. The coils 44, 46, 73 and 74 are shown as single turn coils in FIG. 6 for clarity of illustration but are preferably multi-turn coils of the hereinbefore described flat spiral form.

In the embodiment of FIG. 6, the output of frequency modulator 59 and filter 61 is applied to fourth coil 74 rather than to the second coil 46 as in the previously described embodiment. The input of demodulator 62 is coupled to the third coil 73 through filter 63 rather than being coupled to the first coil as in the previous instance. Except as herein described, the embodiment of FIG. 6 may be similar to the embodiment of the preceding figures.

Figure 7:
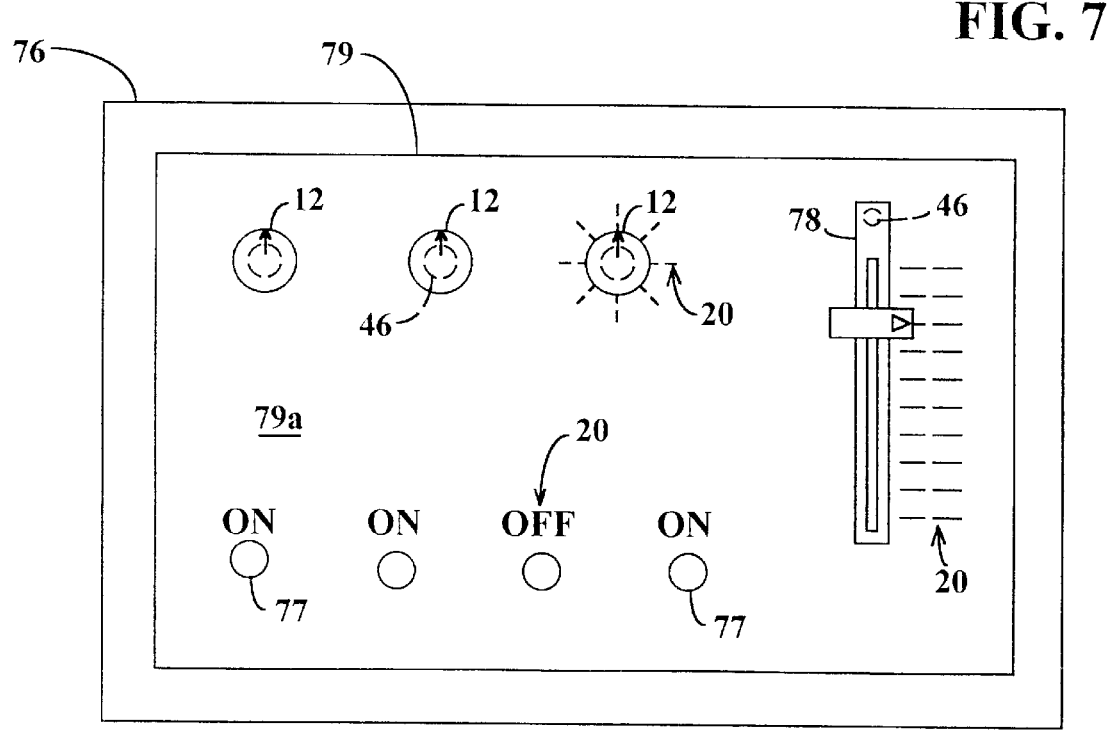
FIG. 7 is a frontal view of a control panel embodying the invention which has a plurality of electrical circuit control devices thereon.

FIG. 7 depicts a control panel 76 having a plurality of circuit control devices of differing types including potentiometers 12, button operated switches 77 and a fader 78 all which are secured to the face of a flat panel display screen 79 within the image area 79a. Referring jointly to FIGS. 5 and 7, each such control device 12, 77, 78 receives operating power and outputs circuit control signals through a separate circuit of the type which has been described with reference to FIG. 5. To avoid cross talk effects in instances where the control devices 12, 77 and 78 are close together, the oscillators 47 of each such circuit are tuned to operate at different frequencies and the frequency modulators 59 each operate at a different range of frequencies. Filters 48 and 53 are replaced with band pass filters which pass only the frequency of the oscillator 47 of the particular circuit and filters 61 and 63 are replaced with band pass filters that pass only the range of frequencies that is produced by the frequency modulator 59 of the particular circuit.

Figure 8:
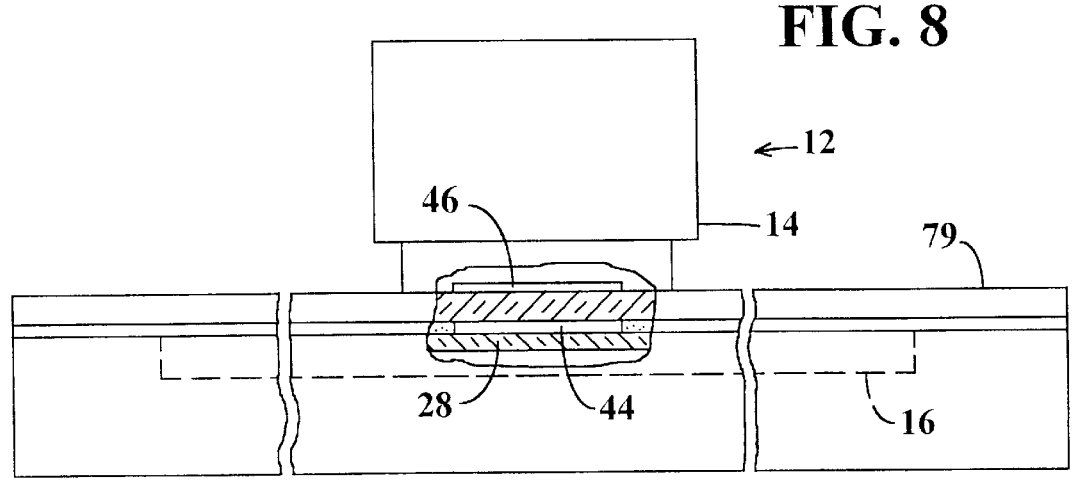
FIG. 8 is a foreshortened and broken out side view of another embodiment of the invention.

The above described embodiments of the invention transfer power and control signals between the front and the back of the flat panel display screen 16. FIG. 8 depicts an alternate arrangement in which the first and second coils 44 and 46 are bonded to the back and front respectively of an outer cover plate 79 which is overlaid on an inner cover plate 28 of the display screen 16 in precise register with the screen. This alternate arrangement can be advantageous in some circumstances for any of various reasons. For example, it provides a simple way of converting pre-existing flat panel displays into control panels embodying the invention with little or no alteration of the internal construction of the display assembly. As another example, some types of flat panel display contain a continuous layer of electrically conductive material which would interfere with the inductive coupling between the coils 44 and 46 if they were at opposite sides of the layer. The construction of some flat panel displays may be such that coils at the front and back of the display are too far apart to interact efficiently.

Figure 9:
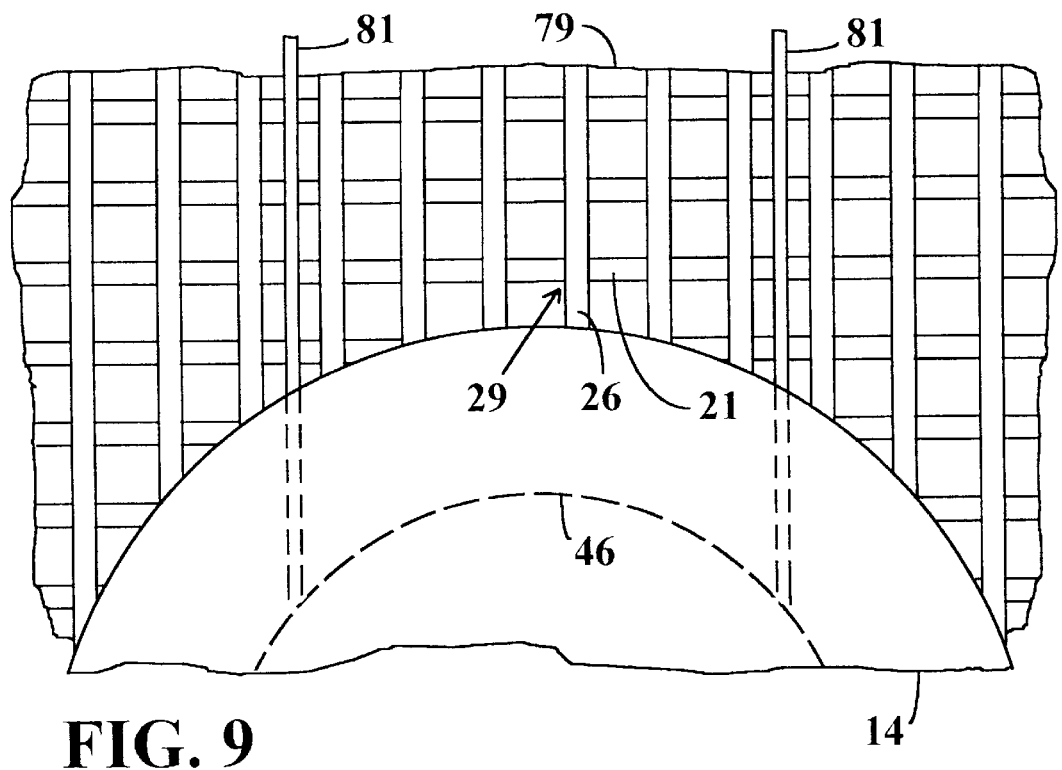
FIG. 9 is a frontal view of a portion of the control panel of FIG. 8.

Referring jointly to FIGS. 8 and 9, disposition of the first coil 44 at the back of the overlay cover plate 79 requires that a pair of conductors 81 extend along the back of the plate, within the image display area, in order to connect the coil to other portions of the circuit in the manner previously described. Pixels 29 of the displayed images in this TFEL type of flat panel display are located at the points where row busbars 21 and column busbars 26 cross each other. Obscuring of image pixels 29 by the conductors 81 can be avoided or minimized by orienting the conductors 81 to extend in parallel relationship with two adjacent rows or columns of pixels at a location midway between the adjacent rows or columns of pixels, the conductors being thin traces of conductive material which are of less width than the inter-pixel spacing. In flat panel displays of the active matrix type, the image pixels are located between rows and columns of busbars. In displays of that kind, obscuring of pixels can be avoided or minimized by orienting and positioning each of the conductors 81 to overlay a row busbar or column busbar. Obscuring of pixels 29 in either type of flat panel display can also be minimized by extending the conductors 81 at a small angle to each other such as a 1° to 5° angle for example. Dimmed pixels, if they are present at all, are then far apart and do not detract from image quality in a significant manner.

Except as described above, the embodiment of FIGS. 8 and 9 may be similar to one of the previously described embodiments of the invention.

Referring again to FIG. 5, transmission of electrical power and control signals between the coils 44 and 46 can be effected if only one end of each coil is connected to other components of the circuit. Coil 44 may be connected only to the output of oscillator 47 through filter 48 and to demodulator 62 through filter 63 and coil 46 may be connected only to rectifier 49 through filter 53 and to frequency modulator 59 through filter 61. Under these conditions the coils 44 and 46 function as transmitting and receiving antennas.

While the invention has been disclosed with reference to certain specific embodiments for purpose of example, many modifications and variations are possible and it is not intended to limit the invention except as defined in the following claims.

We claim:

1. A control panel for an electrical circuit which control panel has at least one control device that can be manually operated to change an electrical condition in said circuit and which has a power input conductor for receiving electrical energization, said control panel having an electrically controlled flat panel display which displays changeable images that convey information pertinent to operation of the control device, the flat panel display having a transparent cover plate and an image display area thereat, wherein the improvement comprises:

said control device being attached to said transparent cover plate and being situated at least partially within said image display area, said control panel further including a first coil situated at a location which is behind said cover plate, an electrical power source coupled to said first coil for applying a varying voltage thereto and a second coil situated at a location which is in front of said cover pate and being coupled to said power input conductor of said control device.

2. The apparatus of claim 1 wherein said flat panel display has substrate layer situated behind said transparent cover plate and wherein said first coil is situated at a back surface of said substrate layer at a location directly behind said control device.

3. The apparatus of claim 1 wherein said transparent cover plate is an outer cover plate overlaying a transparent inner cover plate of said flat panel display, said first coil being between said inner and outer transparent cover plates and said second coil being between said control device and said outer transparent cover plate.

4. The apparatus of claim 1 wherein said control device has a base secured to said transparent cover plate and being located at partially within said image display area and has movable member extending from said base that is manipulated by an operator to operate said control device, said second coil being within said base.

5. The apparatus of claim 1 wherein said second coil is a spiral shaped trace of conductive material bonded to said transparent cover plate.

6. The apparatus of claim 1 wherein said flat panel display has a substrate layer situated behind said transparent cover plate and a driver circuit board situated behind said substrate layer and extending in parallel relationship therewith, further including a control device circuit board situated between said substrate layer and said driver circuit board and extending in parallel relationship therewith, said first coil being a component of said control device circuit board.

7. The apparatus of claim 1 wherein said control device produces a control signal for said electrical circuit, further including a modulator receiving said control signal and which produces an oscillating voltage signal that is encoded to represent the current value of said control signal, said modulator being coupled to said second coil to apply said oscillating voltage signal thereto, and a demodulator coupled to said first coil and receiving said oscillating voltage signal therefrom, said demodulator having at least one output conductor for transmitting said control signal to said electrical circuit.

8. The apparatus of claim 7 wherein said electrical power source produces an oscillating voltage having a first frequency and said modulator produces an oscillating voltage having a second differing frequency.

9. The apparatus of claim 8 further including first and second filters which pass said second frequency and which suppress said first frequency, said modulator being coupled to said second coil through said first filter and said demodulator being coupled to said first coil through said second filter.

10. The apparatus of claim 9 further including a third and a fourth filter which pass said first frequency and which suppress said second frequency, said power input conductor of said control device being coupled to said second coil through said third filter and said electrical power source being coupled to said first coil through said fourth filter.

11. The apparatus of claim 7 wherein said control device produces said control signal in the form of a DC voltage having a magnitude that is variable by operator adjustment of said control device, further including means for converting said DC voltage to a digital data byte which encodes the current magnitude of said DC voltage and wherein said modulator modulates said oscillating voltage to encode said digital data byte therein in serial form.

12. The apparatus of claim 7 having a plurality of the control devices attached to said transparent cover plate each being situated at least partially within said image display area and having a plurality of said modulators each being within a separate one of said control devices and having a plurality of said demodulators situated at locations which are behind said transparent cover plate and behind separate ones of said control devices, wherein said modulators operate at different frequencies.

13. The apparatus of claim 1 wherein said control device produces a control signal for said electrical circuit, further including a third coil situated at a location which is behind said transparent cover plate and a fourth coil situated at a location which is in front of said cover plate, a modulator receiving said control signal and which produces an oscillating voltage signal that is encoded to represent the current value of said control signal, said modulator being coupled to said fourth coil to apply said oscillating voltage signal thereto, and a demodulator coupled to said third coil and receiving said oscillating voltage signal therefrom, said demodulator having at least one output conductor for transmitting said control signal to said electrical circuit.

14. The apparatus of claim 13 wherein said electrical power source produces an oscillating voltage having a first frequency and said modulator produces an an oscillating voltage signal having a second differing frequency.

15. The apparatus of claim 14 further including first and second filters which pass said second frequency and which suppress said first frequency, said modulator being coupled to said fourth coil through said first filter and said demodulator being coupled to said third coil through said second filter.

16. The apparatus of claim 15 further including a third and a fourth filter which pass said first frequency and which suppress said second frequency, said power input conductor of said control device being coupled to said fourth coil through said third filter and said electrical power source being coupled to said third coil through said fourth filter.

17. The apparatus of claim 13 wherein said control device produces said control signal in the form of a DC voltage having a magnitude that is variable by operator adjustment of said control device, further including means for converting said DC voltage to a digital data byte which encodes the current magnitude of said DC voltage and wherein said modulator modulates said oscillating voltage to encode said digital data byte therein in serial form.

18. The apparatus of claim 13 wherein said first and third coils are concentric with each other, said third coil being of smaller diameter than said first coil, and wherein said second and fourth coils are concentric with each other, said fourth coil being of smaller diameter than said second coil.

19. The apparatus of claim 13 having a plurality of the control devices attached to said transparent cover plate each being situated at least partially within said image display area and having a plurality of said modulators each being within a separate one of said control devices and having a plurality of said demodulators situated at locations which are behind said transparent cover plate and behind separate ones of said control devices, wherein said modulators operate at different frequencies.

20. An electrical circuit control panel comprising:
an electrically controlled flat panel display having a transparent cover plate with an image display area at which changeable images may be viewed;
an electrical circuit control device disposed in front of said flat panel display within said image display area, said circuit control device having a fixed base secured to a front surface of said transparent cover plate and having a movable member which can be manipulated by an operator to change an electrical condition in the controlled electrical circuit, said circuit control device having a power input conductor and a control signal output conductor;
a first coil disposed at a location which is behind said circuit control device and behind said transparent cover plate;
an electrical power source coupled to said first coil for applying an oscillating voltage thereto; and a second electrical coil disposed within said base of said circuit control device and being coupled to said power input conductor thereof.

21. The apparatus of claim 20 further including a modulator within said circuit control device which produces an oscillating voltage signal that encodes the control signals, said modulator being coupled to said second coil to apply said oscillating voltage signal thereto; and a demodulator which converts said oscillating voltage signal to digital data bytes encoding said control signals, said demodulator being at a location which is behind said transparent cover plate and being coupled to said first coil to receive said oscillating voltage signal therefrom.

22. The apparatus of claim 20 further including a third coil situated at a location which is behind said transparent cover plate and a fourth coil situated within said control device; a modulator within said circuit control device which produces an oscillating voltage signal that encodes the control signals, said modulator being coupled to said fourth coil to apply said oscillating voltage signal thereto; and a demodulator which converts said oscillating voltage signal to digital data bytes encoding said control signals, said demodulator being at a a location which is behind said transparent cover plate and being coupled to said third coil to receive said oscillating voltage signal therefrom.

\* \* \* \* \*